United States Patent
Komori et al.

(10) Patent No.: US 12,094,676 B2
(45) Date of Patent: Sep. 17, 2024

(54) PROTECTIVE ELEMENT AND PROTECTIVE CIRCUIT

(71) Applicant: DEXERIALS CORPORATION, Tochigi (JP)

(72) Inventors: Chisato Komori, Shimotsuke (JP); Yoshihiro Yoneda, Shimotsuke (JP)

(73) Assignee: DEXERIALS CORPORATION, Tochigi (JP)

( * ) Notice: Subject to any disclaimer, the term of this patent is extended or adjusted under 35 U.S.C. 154(b) by 93 days.

(21) Appl. No.: 17/755,297

(22) PCT Filed: Oct. 14, 2020

(86) PCT No.: PCT/JP2020/038792
§ 371 (c)(1),
(2) Date: Apr. 26, 2022

(87) PCT Pub. No.: WO2021/085140
PCT Pub. Date: May 6, 2021

(65) Prior Publication Data
US 2022/0367137 A1 Nov. 17, 2022

(30) Foreign Application Priority Data

Oct. 30, 2019 (JP) .................................. 2019-197864

(51) Int. Cl.
*H01H 85/06* (2006.01)
*H01H 85/00* (2006.01)
*H01H 85/055* (2006.01)

(52) U.S. Cl.
CPC ........ *H01H 85/06* (2013.01); *H01H 85/0052* (2013.01); *H01H 2085/0555* (2013.01); *H01H 2231/026* (2013.01)

(58) Field of Classification Search
CPC ............... H01H 85/06; H01H 85/0052; H01H 2085/0555; H01H 2231/026; H01H 85/143
See application file for complete search history.

(56) References Cited

U.S. PATENT DOCUMENTS

| 2,095,222 | A | * | 10/1937 | Wilms | ................ | H01H 71/205 337/147 |
| 10,395,876 | B1 | * | 8/2019 | Su | ........................ | H01H 85/04 |

(Continued)

FOREIGN PATENT DOCUMENTS

| CN | 1610996 | 4/2005 |
| CN | 201584389 | 9/2010 |

(Continued)

OTHER PUBLICATIONS

Komori Chisato; Yoneda Yoshihiro; Fujihata Takashi, "Protection Element and Protection Circuit", Feb. 4, 2016, Dexerials Corp., Entire Document (Translation of WO 2016017567) (of record, cited in the IDS, including Original Copy). (Year: 2016).*

(Continued)

*Primary Examiner* — Stephen S Sul
(74) *Attorney, Agent, or Firm* — Schwegman Lundberg & Woessner, P.A.

(57) ABSTRACT

This protective element includes a fusible conductor (1*a*), three or more electrodes (2*a*), (2*b*), (2*c*) electrically connected to each other via the fusible conductor (1*a*), and a heating element configured to heat and fuse the fusible conductor (1*a*).

14 Claims, 7 Drawing Sheets

(56) References Cited

U.S. PATENT DOCUMENTS

| | | | | | |
|---|---|---|---|---|---|
| 2002/0041476 | A1* | 4/2002 | Petris | ................ | H01L 23/4334 |
| | | | | | 257/E23.092 |
| 2017/0236667 | A1* | 8/2017 | Furuuchi | .............. | H01H 37/761 |
| | | | | | 327/525 |
| 2017/0338645 | A1* | 11/2017 | Wang | ................ | H01H 85/0241 |
| 2017/0370341 | A1* | 12/2017 | Verot | ................... | H01H 85/055 |
| 2019/0214810 | A1* | 7/2019 | Douglass | .............. | H02P 29/024 |

FOREIGN PATENT DOCUMENTS

| | | |
|---|---|---|
| CN | 103745898 | 4/2014 |
| CN | 104299868 | 1/2015 |
| CN | 104882850 | 9/2015 |
| CN | 105474346 | 4/2016 |
| CN | 205335209 | 6/2016 |
| CN | 105895849 | 8/2016 |
| CN | 106415770 | 2/2017 |
| CN | 107404104 | 11/2017 |
| CN | 109196740 | 1/2019 |
| JP | 2005339965 | 12/2005 |
| JP | 2009214572 A | 9/2009 |
| JP | 2010040282 | 2/2010 |
| JP | 2014179309 | 9/2014 |
| JP | 2016035816 A | 3/2016 |
| TW | 201631615 | 9/2016 |
| WO | 2016017567 | 2/2016 |
| WO | WO-2020026859 A1 * | 2/2020 |

OTHER PUBLICATIONS

Chen Tseng-Wen; Chen Sha-Li, "Composite protection device, protection circuit, chargeable and dischargeable battery pack", Aug. 24, 2016, Entire Document (Translation of CN 105895849) (of record, cited in the IDS, including Original Copy). (Year: 2016).*

Kanematsu Kenji; Fukuda Yoshihisa; Kimoto Shinya, "Shut-Off Module", Feb. 6, 2020, Panasonic IP Man Co. Ltd., Entire Document (Translation of WO 2020026859). (Year: 2020).*

"Chinese Application Serial No. 202080073848.0, Office Action dated Jul. 14, 2023", w English Translation, (Jul. 14, 2023), 22 pgs.

"International Application Serial No. PCT/JP2020/038792, International Search Report dated Dec. 22, 2020", (Dec. 22, 2020), 2 pgs.

"International Application Serial No. PCT/JP2020/038792, Written Opinion dated Dec. 22, 2020", (Dec. 22, 2020), 3 pgs.

"Taiwanese Application Serial No. 109137424, Office Action dated Jan. 26, 2024", w English Translation, (Jan. 26, 2024), 19 pgs.

* cited by examiner

PROTECTIVE ELEMENT AND PROTECTIVE CIRCUIT

PRIORITY APPLICATIONS

This application is a U.S. National Stage Filing under 35 U.S.C. § 371 from International Application No. PCT/JP2020/038792, filed on Oct. 14, 2020, and published as WO2021/085140 on May 6, 2021, which claims the benefit of priority to Japanese Application No. 2019-197864, filed on Oct. 30, 2019; the benefit of priority of each of which is hereby claimed herein, and which applications and publication are hereby incorporated herein by reference in their entireties.

TECHNICAL FIELD

The present invention relates to a protective element and a protective circuit.

BACKGROUND ART

In the related art, there are vehicles equipped with an electric power steering system (EPS). The electric power steering system assists in applying the force (steering force) required for a driver's steering wheel operation when a vehicle is in operation.

The electric power steering system is provided with a motor that assists in applying the steering force and outputs rotational torque according to the magnitude of the force, a drive circuit that drives the motor, and a protective circuit that prevents abnormal behavior of the motor.

Generally, as a method of rotating a motor, a method is used in which a rotating magnetic field is created by using three coils (stator) and power having different phases in a three-phase alternating current supplied to each of the coils, and a magnet (rotor) is rotated in synchronization with the rotating magnetic field. Power having different phases in a three-phase alternating current is supplied from an inverter to each of the three coils for rotating the motor via a power supply wiring.

In an electric power steering system of the related art, a three-terminal contact (mechanical) relay that electrically connects and disconnects between each coil and an inverter is provided in a power supply wiring that connects each coil to the inverter that supplies power to the coil. The three-terminal contact relay connects or disconnects between each coil and the inverter in conjunction with the start of an engine of a vehicle, and drives or stops the motor. The three-terminal contact relay disconnects between each coil and the inverter and stops the drive of the motor in a case where an abnormality has occurred in the power supplied to the coil due to a failure of the inverter or the like.

As an electric power steering system of the related art, for example, Patent Document 1 discloses a steering control device that drives a steering assist motor configured with a three-phase AC motor with a motor drive current generated by a motor drive circuit to assist in steering of a steering wheel. In the steering control device disclosed in Patent Document 1, an emergency switch element is provided on a power supply line connected to the steering assist motor, and when an abnormality occurs, the emergency switch element is turned off to disconnect between the motor drive circuit and the steering assist motor. Patent Document 1 discloses a protective circuit having a fuse that can be fused by receiving power generated by the steering assist motor after the emergency switch element is turned off.

CITATION LIST

Patent Document

[Patent Document 1]
Japanese Unexamined Patent Application, First Publication No. 2009-214572

SUMMARY OF INVENTION

Technical Problem

In the electric power steering system of the related art, when an abnormality has occurred in the power supplied to the coil, the drive of the motor is stopped by using the three-terminal contact relay, which has the following problems.

In the three-terminal contact relay, the connection and disconnection between each coil and the inverter switch therebetween by mechanically opening and closing the contacts. Thus, a component that hinders conduction, such as dirt, may adhere to the contacts, resulting in poor conduction.

In the three-terminal contact relay, since energization occurs through contact of the contacts, the internal resistance is high and heat is easily generated. Thus, it is necessary to give priority to suppressing the heat generation of the three-terminal contact relay rather than causing a large current to flow through the coil to output a sufficient rotational torque from the motor, and thus the output of the motor may be required to be suppressed.

As a method of reducing the internal resistance of the three-terminal contact relay, it is conceivable to increase sizes of contacts to be contacted during energization. However, in a case where the sizes of the contacts of the three-terminal contact relay are increased, a volume of the three-terminal contact relay increases, and the electric power steering system becomes large. For this reason, it is difficult to use a method of increasing the sizes of the contacts of the three-terminal contact relay to reduce the internal resistance.

Thus, there is a demand for a technique capable of stopping a motor when an abnormality has occurred in the power supplied to a coil in an electric power steering system without using a three-terminal contact relay.

In the steering control device disclosed in Patent Document 1, it is not necessary to use a three-terminal contact relay because the emergency switch element is turned off and thus the motor drive circuit and the steering assist motor are disconnected from each other when an abnormality occurs.

However, in order to be able to disconnect between the motor drive circuit and the steering assist motor when an abnormality occurs by using the technique disclosed in Patent Document 1, it is necessary to provide a large number of elements. Thus, the steering control device disclosed in Patent Document 1 has a disadvantage that it takes time and effort at the time of manufacturing thereof.

The present invention has been made in view of the above circumstances, and an object thereof is to provide a protective element and a protective circuit that are smaller than a three-terminal contact relay, can cause a large current to flow, have less occurrence of poor conduction due to dirt on contacts unlike the three-terminal contact relay, and can cut off a current path to be cut off with a small number of elements.

Solution to Problem

The present invention provides the following means for solving the above problems.

(1) A protective element according to a first aspect of the present invention including a fusible conductor; three or more electrodes electrically connected to each other via the fusible conductor; and a heating element configured to heat and fuse the fusible conductor.

(2) The protective element according to (1), in which two or more electrodes among the three or more electrodes are electrically connected to each other via a plurality of fusible conductors that are electrically connected to each other via a connection wiring.

(3) The protective element according to (2), in which the connection wiring and at least part of the heating element overlap each other in a plan view.

(4) The protective element according to (1), in which two or more electrodes among the three or more electrodes are electrically connected to each other via a single fusible conductor.

(5) The protective element according to (4), in which the fusible conductor and at least part of the heating element overlap each other in a plan view.

(6) The protective element according to any one of (1) to (5), in which the heating element is electrically insulated from the fusible conductor.

(7) The protective element according to any one of (1) to (5), in which the heating element is electrically connected to the fusible conductor.

(8) The protective element according to any one of (1) to (7), in which the three or more electrodes are respectively electrically connected to power supply wirings for supplying power having different phases in a polyphase alternating current.

(9) The protective element according to any one of (1) to (8), further including a control circuit configured to detect an abnormality in power supplied to some or all of the three or more electrodes and thus supplies power to the heating element.

(10) A protective circuit according to a second aspect of the present invention including a fusible conductor; three or more electrodes electrically connected to each other via the fusible conductor; and a heating element configured to heat and fuse the fusible conductor.

(11) The protective circuit according to (10), in which two or more electrodes among the three or more electrodes are electrically connected to each other via a plurality of fusible conductors that are electrically connected to each other via a connection wiring

(12) The protective circuit according to (11), in which the connection wiring and at least part of the heating element overlap each other in a plan view.

(13) The protective circuit according to (10), in which two or more electrodes among the three or more electrodes are electrically connected to each other via a single fusible conductor.

(14) The protective circuit according to (13), in which the fusible conductor and at least part of the heating element overlap each other in a plan view.

(15) The protective circuit according to any one of (10) to (14), in which the heating element is electrically insulated from the fusible conductor.

(16) The protective circuit according to any one of (10) to (14), in which the heating element is electrically connected to the fusible conductor.

(17) The protective circuit according to any one of (10) to (16), in which the three or more electrodes are respectively electrically connected to power supply wirings for supplying power having different phases in a polyphase alternating current.

(18) The protective circuit according to any one of (10) to (17), further including a control circuit configured to detect an abnormality in power supplied to some or all of the three or more electrodes and thus supplies power to the heating element.

Advantageous Effects of Invention

The protective element and protective circuit of the present invention include the fusible conductor, the three or more electrodes electrically connected to each other via the fusible conductor, and heating element configured to heat and fuse the fusible conductor. Therefore, according to the protective element and the protective circuit of the present invention, current paths electrically connected to the three or more electrodes can be cut off by a single element due to heat generated by the heating element. Therefore, by using the protective element and the protective circuit of the present invention, the number of elements can be reduced compared with a case of using an element that cuts off only one current path. The protective element and the protective circuit of the present invention are smaller than a three-terminal contact relay, and can cause a large current to flow, and a conduction failure due to the dirt on contacts does not occur unlike the three-terminal contact relay.

DESCRIPTION OF EMBODIMENTS

Figure 1:
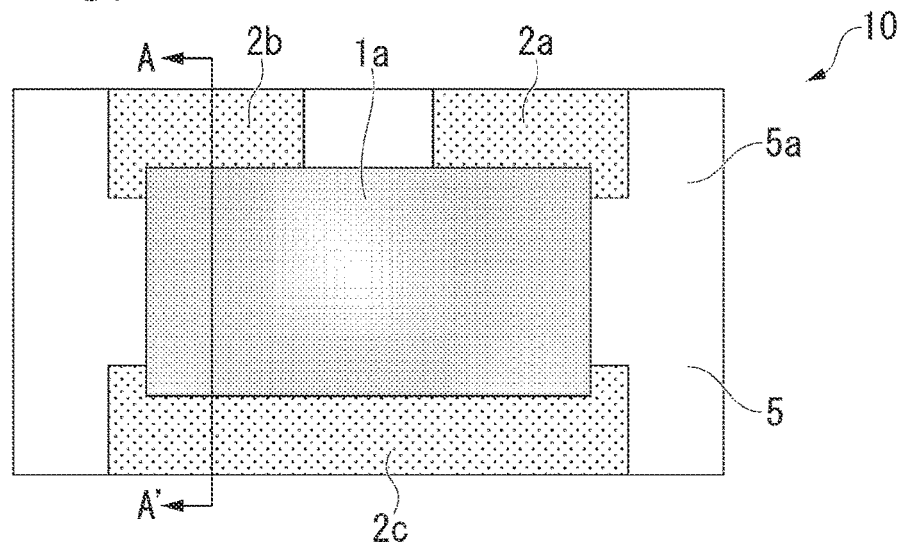
FIG. 1 is a plan view showing a protective element according to a first embodiment.

Hereinafter, a protective element and a protective circuit according to the present invention will be described in detail with reference to the drawings as appropriate. In the drawings used in the following description, for better understanding of the features of the present invention, the featured portions may be enlarged for convenience, and a dimensional ratio of each constituent may differ from the actual one. The materials, dimensions, and the like that exemplified in the following description are examples, and the present invention is not limited thereto, and may be appropriately modified and carried out within the scope in which the effects of the present invention are achieved.

First Embodiment

Figure 2:
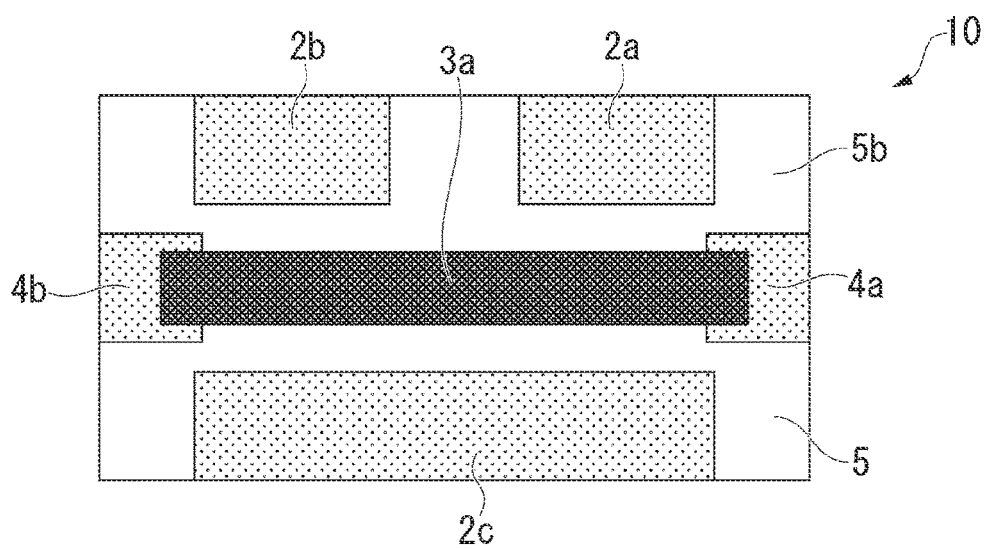
FIG. 2 is a plan view in which the protective element shown in FIG. 1 is viewed from the opposite side to that in FIG. 1.
Figure 3:
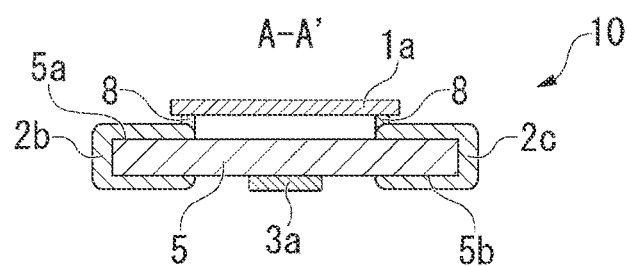
FIG. 3 is a sectional view in which the protective element shown in FIG. 1 is taken along the A-A' line.
Figure 4:
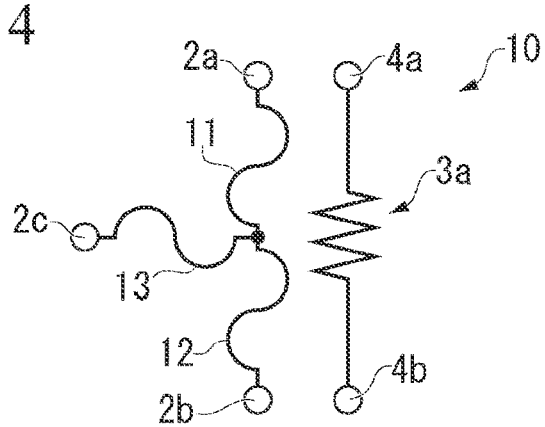
FIG. 4 is a schematic diagram showing a protective circuit of the first embodiment having a circuit configuration of the protective element shown in FIG. 1.

FIG. 1 is a plan view showing a protective element of a first embodiment. FIG. 2 is a plan view in which the protective element shown in FIG. 1 is viewed from the opposite side to that in FIG. 1. FIG. 3 is a sectional view in which the protective element shown in FIG. 1 is taken along the A-A' line. FIG. 4 is a schematic diagram showing a protective circuit of the first embodiment having a circuit configuration of the protective element shown in FIG. 1.

As shown in FIGS. 1 to 3, a protective element 10 of the present embodiment includes an insulating substrate 5, a fusible conductor 1a, three electrodes 2a, 2b, 2c, a heating element 3a, a first heating element electrode 4a, and a second heating element electrode 4b.

In the present embodiment, as an exemplary example, a case will be described in which the protective element 10 shown in FIGS. 1 and 4 is used for the purpose of stopping a motor in a case where an abnormality has occurred in the power supplied to some or all coils in the motor that creates a rotating magnetic field by using three coils (stator) and power having different phases in a three-phase alternating current supplied to each of the coils and rotates a magnet (rotor) in synchronization with the rotating magnetic field.

In the protective element 10 of the present embodiment, the fusible conductor 1a forms part of current paths for supplying power to the three coils. In the present embodiment, the fusible conductor 1a is fused to cut off current paths for supplying power to at least two of the three coils.

The insulating substrate 5 has a substantially rectangular plate shape in a plan view. The insulating substrate 5 may be any substrate as long as the substrate has electrical insulating property, and a known insulating substrate such as a resin substrate, a ceramics substrate, or a composite substrate of a resin and ceramics may be used. Specific examples of the resin substrate include an epoxy resin substrate, a fail resin substrate, and a polyimide substrate. Specific examples of the ceramics substrate include an alumina substrate, a glass ceramics substrate, a mullite substrate, and a zirconia substrate. Specific examples of the composite substrate include a glass epoxy substrate.

In the protective element 10 of the present embodiment, as shown in FIG. 1, only one fusible conductor (fuse element) 1a is provided substantially at the center of one surface (front surface 5a in FIG. 1) of the insulating substrate 5. As shown in FIG. 3, the fusible conductor 1a is electrically connected to the three electrodes 2a, 2b, and 2c by being joined via a conductive connection member 8 such as a solder. As shown in FIG. 3, a space is formed between the fusible conductor 1a and the front surface 5a of the insulating substrate 5. The fusible conductor 1a is fused by heat generated by the heating element 3a and/or by an overcurrent state in which an excessive current exceeding the rating is applied.

As shown in FIG. 1, a planar shape of the fusible conductor 1a is a substantially rectangular shape having sides substantially parallel to the side surface of the insulating substrate 5. In the present embodiment, a case where the fusible conductor 1a has a substantially rectangular shape in a plan view having sides substantially parallel to the side surface of the insulating substrate 5 will be described as an exemplary example, but a planar shape of the fusible conductor may be determined as appropriate according to disposition of the electrodes 2a, 2b, and 2c, and is not particularly limited. For example, a planar shape of the fusible conductor may be a polygonal shape such as a substantially square shape, a substantially circular shape, a substantially elliptical shape, or a substantially triangular shape, a substantially star shape, or an irregular shape.

A thickness of the fusible conductor 1a may be determined as appropriate depending on a material of the fusible conductor 1a, an application of the protective element 10, and the like, and is not particularly limited. The fusible conductor may have a substantially uniform thickness, or may have a thick region and a thin region.

The fusible conductor 1a may be formed of a single layer made of a uniform material, or may be a structure containing a high melting point metal layer and a low melting point metal layer.

In a case where the fusible conductor 1a is formed of a single layer made of a uniform material, examples of the material of the fusible conductor 1a may include a SnAgCu-based Pb-free solder, a BiPbSn alloy, a BiPb alloy, a BiSn alloy, a SnPb alloy, a PbIn alloy, a ZnAl alloy, an InSn alloy, and a PbAgSn alloy.

In a case where the fusible conductor 1a is a structure containing a high melting point metal layer and a low melting point metal layer, for example, a laminated structure formed of an inner layer made of a low melting point metal and an outer layer made of a high melting point metal formed to cover an outer surface of the inner layer, a laminated structure formed of an inner layer made of a high melting point metal and an outer layer made of a low melting point metal formed to cover an outer surface of the inner layer, a multi-layer structure having four or more layers in which a layer made of a low melting point metal and a layer made of a high melting point metal are alternately laminated in a thickness direction, and the like may be used.

As a metal used for the low melting point metal layer, it is preferable to use a metal containing solder or Sn as a main component. As such a metal, a metal generally called "Pb-free solder" (for example, M705 manufactured by Senju Metal Industry Co., Ltd.) may be used. A metal used for the low melting point metal layer does not have to have a melting point higher than the temperature of a reflow furnace, and may be melted at, for example, about 200° C.

As a metal used for the high melting point metal layer, for example, Ag or Cu, or a metal containing any one of these as a main component may be used. A metal used for the high melting point metal layer preferably has a melting point higher than the temperature of a reflow furnace such that the fusible conductor 1a is not melted when the fusible conductor 1a is mounted through reflow.

In a case where the fusible conductor 1a is the above laminated structure formed of the inner layer made of a low melting point metal and the outer layer made of a high melting point metal, since the outer layer is formed to cover the outer surface of the inner layer, even if the fusible conductor 1a is mounted at a reflow temperature exceeding a melting temperature of the low melting point metal, the fusible conductor 1a is not fused. Therefore, the fusible conductor 1a can be efficiently mounted through reflow.

In a case where the fusible conductor 1a is the laminated structure formed of the inner layer made of a low melting point metal and the outer layer made of a high melting point metal, the melted low melting point metal erodes the outer layer of the high melting point metal when the fusible conductor 1a is fused. Thus, the high melting point metal forming the outer layer is melted at a temperature lower than the melting point and is efficiently fused. Therefore, in the protective element 10 in which the fusible conductor 1a is the laminated structure formed of the inner layer made of a low melting point metal and the outer layer made of a high melting point metal, for example, a sectional area of the fusible conductor can be increased compared with a case where a fusible conductor with the same size made of a high melting point metal is provided, and thus the current rating can be improved. For example, compared with a case where a fusible conductor having the same current rating made of a high melting point metal is provided, a size and/or a thickness can be reduced, and the quick fusibility is excellent.

In a case where the fusible conductor 1a is a structure containing a high melting point metal layer and a low melting point metal layer, the fusible conductor 1a can be formed by using a well-known laminate technique and/or film forming technique.

For example, in a case where the fusible conductor 1a is a laminated structure formed of an inner layer made of a high melting point metal and an outer layer made of a high melting point metal, the fusible conductor may be manufactured according to a method of forming a high melting point metal layer on a surface of a foil made of a low melting point metal by using a plating technique.

As shown in FIGS. 1 and 3, each of the three electrodes 2a, 2b, and 2c provided in the protective element 10 of the present embodiment is electrically connected to the fusible conductor 1a via the conductive connection member 8 on the front surface 5a of the insulating substrate 5. Consequently, the electrodes 2a, 2b, and 2c are electrically connected to each other via one fusible conductor 1a.

The three electrodes 2a, 2b, and 2c are respectively electrically connected to power supply wirings (not shown) for supplying power having phases different by 1/3 in a three-phase alternating current. As a result, the fusible conductor 1a of the protective element 10 is part of the current path for supplying power to the three coils.

The electrodes 2a, 2b, and 2c formed on the front surface 5a of the insulating substrate 5 are respectively electrically connected to the electrodes 2a, 2b, and 2c formed on the other surface of the insulating substrate 5 (rear surface 5b in FIG. 1) via castings formed on the side surfaces of the insulating substrate 5. The castings are formed by covering the inside of substantially semicircular through-holes provided on the side surfaces of the insulating substrate 5 with a conductive material. The electrodes 2a, 2b, and 2c formed on the front surface 5a of the insulating substrate 5 and the electrodes 2a, 2b, 2c formed on the rear surface 5b of the insulating substrate 5 may be electrically connected via through-holes.

As shown in FIGS. 1 and 2, in the protective element 10 of the present embodiment, the electrodes 2a, 2b, and 2c formed on the front surface 5a and the rear surface 5b of the insulating substrate 5 are both disposed at edges along the long sides of the insulating substrates 5 having a substantially rectangular shape in a plan view. More specifically, the electrodes 2a and 2b are disposed apart along the edge of one of the two long sides of the insulating substrate 5. The electrodes 2c are disposed along the edge of the long side of the two long sides of the insulating substrate 5 along which the electrodes 2a and 2b are not disposed. As shown in FIGS. 1 and 2, the electrodes 2a and 2b and the electrodes 2c are disposed to face each other in a plan view. The electrode 2c has a larger length in the direction along the long side of the insulating substrate 5 than the electrodes 2a and 2b.

Each of the three electrodes 2a, 2b, and 2c provided in the protective element 10 of the present embodiment is formed by a conductive pattern such as an Ag wiring or a Cu wiring. The three electrodes 2a, 2b, and 2c may be made of different materials, or two or all of the three electrodes may be made of the same material.

Each of surfaces of the electrodes 2a, 2b, and 2c may be coated with an electrode protective layer in order to suppress deterioration in electrode characteristics due to oxidation or the like. As a material of the electrode protective layer, for example, a Sn plating film, a Ni/Au plating film, a Ni/Pd plating film, or a Ni/Pd/Au plating film may be used.

As shown in FIG. 2, the heating element 3a provided in the protective element 10 of the present embodiment is provided on the rear surface 5b of the insulating substrate 5 having a substantially rectangular shape in a plan view. The heating element 3a is provided in a strip shape along the long side direction at a substantially central portion in the short side direction on the rear surface 5b of the insulating substrate 5. As shown in FIGS. 1 to 3, the heating element 3a is electrically insulated from the fusible conductor 1a by the insulating substrate 5.

The heating element 3a is energized by a control circuit that will be described later in a case where an abnormality in the power supplied to some or all of the three electrodes 2a, 2b, and 2c is detected. The heating element 3a generates heat when energized, and heats the fusible conductor 1a via the insulating substrate 5 to fuse the fusible conductor 1a.

In the present embodiment, as shown in FIG. 3, the fusible conductor 1a and part of the heating element 3a overlap each other in a plan view. Specifically, the central portion of the heating element 3a overlaps the fusible conductor 1a in a plan view, and the substantially central portion of the fusible conductor 1a in the short side direction of the insulating substrate 5 and the heating element 3a are disposed to overlap each other. In the present embodiment, in a case where the heating element 3a generates heat, the heat is efficiently transferred to the region where the heating element 3a and the fusible conductor 1a overlap each other in a plan view, and the substantially central portion of the fusible conductor 1a in the short side direction of the insulating substrate 5 is heated efficiently, and thus the fusible conductor 1a is quickly fused.

The heating element 3a is made of a high resistance conductive material that has a relatively high resistance and generates heat when energized. Examples of the high resistance conductive material include materials containing nichrome, W, Mo, and Ru.

As shown in FIG. 2, the heating element 3a provided in the protective element 10 of the present embodiment is electrically connected to two heating element electrodes such as a first heating element electrode 4a and a second heating element electrode 4b. The first heating element electrode 4a and the second heating element electrode 4b are disposed to face each other in a plan view at the edges along the short sides of the rear surface 5b of the insulating substrate 5 having a substantially rectangular shape in a plan view. As a material of the first heating element electrode 4a and the second heating element electrode 4b, the same material that may be used for the electrodes 2a, 2b, and 2c may be used. The first heating element electrode 4a and the second heating element electrode 4b may be made of different materials or may be made of the same material.

The protective element 10 of the present embodiment includes a control circuit that supplies power to the heating element 3a when detecting an abnormality in the power supplied to some or all of the three electrodes 2a, 2b, and 2c. Specifically, in the present embodiment, when detecting the above abnormality, power is supplied from the control circuit to the heating element 3a by using the first heating element electrode 4a and the second heating element electrode 4b.

The protective element 10 of the present embodiment includes a detection circuit that detects an abnormality in the power supplied to the three electrodes 2a, 2b, and 2c. The detection circuit detects an amount of voltage generated by energizing a predetermined resistance component on the three power supply wirings that respectively supply power to the three electrodes 2a, 2b, and 2c, and supplies the result to the control circuit.

In a case where an abnormality in the power supplied to some or all of the three electrodes 2a, 2b, and 2c is detected, the control circuit grounds the second heating element electrode 4b and supplies power to the heating element 3a via the first heating element electrode 4a according to the detection result from the detection circuit.

(Production Method)

The protective element 10 of the present embodiment may be manufactured, for example, according to a method described below.

First, three electrodes 2a, 2b, and 2c are formed at predetermined positions on the front surface 5a of the insulating substrate 5. The electrodes 2a, 2b, and 2c may be formed according to a known method such as a method of patterning a conductive material on the front surface 5a of the insulating substrate 5. Next, three electrodes 2a, 2b, and 2c are formed at predetermined positions on the rear surface 5b of the insulating substrate 5 in the same manner as on the front surface 5a.

Next, the first heating element electrode 4a and the second heating element electrode 4b are formed at predetermined positions on the rear surface 5b of the insulating substrate 5 by using a known method such as a method of patterning a conductive material. In a case where the first heating element electrode 4a and the second heating element electrode 4b are formed by using the same material as that of the electrodes 2a, 2b and 2c, the first heating element electrode 4a and the second heating element electrode 4b, and the electrode 2a, 2b, and 2c may be simultaneously formed.

The electrodes 2a, 2b, 2c, the first heating element electrode 4a, and the second heating element electrode 4b may be formed according to a method in which a conductive paste containing a predetermined conductive material is applied at predetermined positions on a front surface and a rear surface of a base material that will serve as the insulating substrate 5 and is then baked at a high temperature.

Next, substantially semicircular through-holes are formed at positions corresponding to the electrodes 2a, 2b, and 2c on the side surfaces of the insulating substrate 5. Next, the inside of the through-hole is covered with a conductive material to form a casting. Consequently, the electrodes 2a, 2b, and 2c formed on the front surface 5a of the insulating substrate 5 are electrically connected to the electrodes 2a, 2b, and 2c formed on the rear surface 5b of the insulating substrate 5.

Next, the heating element 3a is formed at a predetermined position on the rear surface 5b of the insulating substrate 5. The heating element 3a may be formed according to a method or the like in which, for example, a mixed paste containing the above high resistance conductive material and a resin binder is produced, and a pattern is formed on the rear surface 5b of the insulating substrate 5 by using a screen printing technique and is then baked.

Next, the fusible conductor 1a is joined to the electrodes 2a, 2b, and 2c formed on the front surface 5a of the insulating substrate 5 by using a cream solder or the like, and fusible conductor 1a is fixed on 2a, 2b, and 2c via the conductive connection member 8 such as a solder according to a reflow soldering method by using a reflow furnace or the like.

Through the above steps, the protective element 10 of the present embodiment is obtained.

A motor (not shown) that is stopped by using the protective element 10 of the present embodiment creates a rotating magnetic field by using three coils (stator) and power supplied to each of the coils, and rotates a magnet (rotor) in synchronization with the rotating magnetic field.

Known coils may be used as the three coils for rotating the motor. The three coils are concentrically disposed to be apart from each other by 120°. Power having phases different by ⅓ in a three-phase alternating current is supplied to the three coils from an inverter via power supply wirings. One end of each of the three coils is electrically connected to the inverter, and the end thereof opposite to the inverter is electrically connected to one of the electrodes 2a, 2b, and 2c of the protective element 10 via the power supply wiring. Consequently, the protective element 10 of the present embodiment forms a joint portion in a Y connection (star connection). Then, a neutral point of the Y connection is formed in the fusible conductor 1a of the protective element 10.

FIG. 4 is a schematic diagram showing a protective circuit of the first embodiment having a circuit configuration of the protective element 10 shown in FIG. 1. In FIG. 4, the same members as those of the protective element 10 shown in FIGS. 1 to 3 are given the same reference signs.

As shown in FIG. 4, the electrode 2a is electrically connected to a fusible conductor 11. The electrode 2b is electrically connected to a fusible conductor 12. The electrode 2c is electrically connected to a fusible conductor 13. In the protective circuit shown in FIG. 4, a Y connection (star connection) is used in which a side of the fusible conductor 11 opposite to the electrode 2a, a side of the fusible conductor 12 opposite to the electrode 2b, and a side of the fusible conductor 13 opposite to the electrode 2c are collectively connected to a neutral point.

In FIG. 4, the three fusible conductors 11, 12, and 13 are shown, but in the protective element 10 shown in FIGS. 1 to 3, the functions of the three fusible conductors 11, 12, and 13 in FIG. 4 are obtained by only one fusible conductor 1a integrated and corresponding to the three fusible conductors 11, 12, and 13.

As shown in FIG. 4, the heating element 3a is electrically connected to two heating element electrodes such as the first heating element electrode 4a and the second heating element electrode 4b. As shown in FIG. 4, the heating element 3a is electrically insulated from the fusible conductors 11, 12, and 13 (the fusible conductor 1a in FIGS. 1 to 3).

The protective circuit of the present embodiment detects an abnormality in the power supplied to some or all of the three electrodes 2a, 2b, and 2c, and thus cuts off at least two current paths among the three power supply wirings for respectively supplying power to the three electrodes 2a, 2b, and 2c.

In the present embodiment, a detection circuit (not shown) included in the protective circuit detects an abnormality in the power supplied to the three electrodes 2a, 2b, and 2c. The detection circuit detects an amount of voltage generated by energizing a predetermined resistance component on the three power supply wirings for respectively supplying power to the three electrodes 2a, 2b, and 2c, and supplies the result to a control circuit (not shown).

In a case where an abnormality in the power supplied to some or all of the three electrodes 2a, 2b, and 2c is detected, the control circuit grounds the second heating element electrode 4b and supplies power to the heating element 3a via the first heating element electrode 4a according to the detection result from the detection circuit. Consequently, the heating element 3a of the protective element 10 generates heat, and thus the fusible conductors 11, 12, and 13 (the fusible conductors 1a in FIGS. 1 to 3) shown in FIG. 4 are melted and fused.

In the present embodiment, in a case where an overcurrent exceeding the rating is applied to some or all of the three electrodes 2a, 2b, and 2c, the fusible conductor 1a of the protective element 10 is melted and fused due to self-heating even if the heating element 3a is not supplied with power.

As shown in FIG. 4, in a case where the fusible conductors 11, 12, and 13 (the fusible conductor 1a in FIGS. 1 to 3) are fused to cut off at least two connections among the electrodes 2a and 2b, the electrodes 2b and 2c, and the electrodes 2a and 2c, at least two current paths among the three power supply wirings for respectively supplying power to the three electrodes 2a, 2b, and 2c are cut off.

As a result, in the present embodiment, a rotating magnetic field that rotates the motor is not generated, and rotation of the motor is stopped. After the rotation of the motor is stopped, the control circuit stops grounding of the second heating element electrode 4b, and the supply of power to the heating element 3a is stopped.

The protective element 10 and the protective circuit of the present embodiment have the fusible conductor, the three electrodes 2a, 2b, and 2c that are electrically connected to each other via the fusible conductor, and the heating element 3a that heats and fuses the fusible conductor. Thus, according to the protective element 10 and the protective circuit of the present embodiment, the three current paths electrically connected to the three electrodes 2a, 2b, and 2c can be cut off by a single element due to heat generated by the heating element 3a. Therefore, by using the protective element 10 and the protective circuit of the present embodiment, the number of elements can be reduced compared with a case where an element that cuts off only one current path is provided in each of the three current paths. The protective element 10 and the protective circuit of the present embodiment are smaller than a three-terminal contact relay, and can cause a large current to flow, and a conduction failure due to the dirt on contacts does not occur unlike the three-terminal contact relay.

The protective element 10 and the protective circuit of the present embodiment include the control circuit that supplies power to the heating element 3a when detecting an abnormality in the power supplied to some or all of the three electrodes 2a, 2b, and 2c. Therefore, in the protective element 10 and the protective circuit of the present embodiment, in a case where an abnormality has occurred in the power supplied to some or all of the three electrodes 2a, 2b, and 2c, the heating element 3a generates heat, the fusible conductor is fused and thus the current path via the fusible conductor is cut off.

In the protective element 10 and the protective circuit of the present embodiment, the three electrodes 2a, 2b, and 2c are respectively electrically connected to the power supply wirings for supplying power having phases different by ⅓ in a three-phase alternating current. Therefore, the protective element 10 and the protective circuit of the present embodiment can be suitably used for the purpose of stopping the motor in a case where an abnormality has occurred in the power supplied to some or all of the coils in the motor that performs rotation by using the three coils and power having different phases supplied to each of the coils. More specifically, the protective element and the protective circuit of the present embodiment can be preferably used for the purpose of stopping the motor in a case where an abnormality has occurred in the power supplied to the coil, such as in a case where an inverter that converts the power supplied to the coil fails in an electric power steering system.

Second Embodiment

Figure 5:
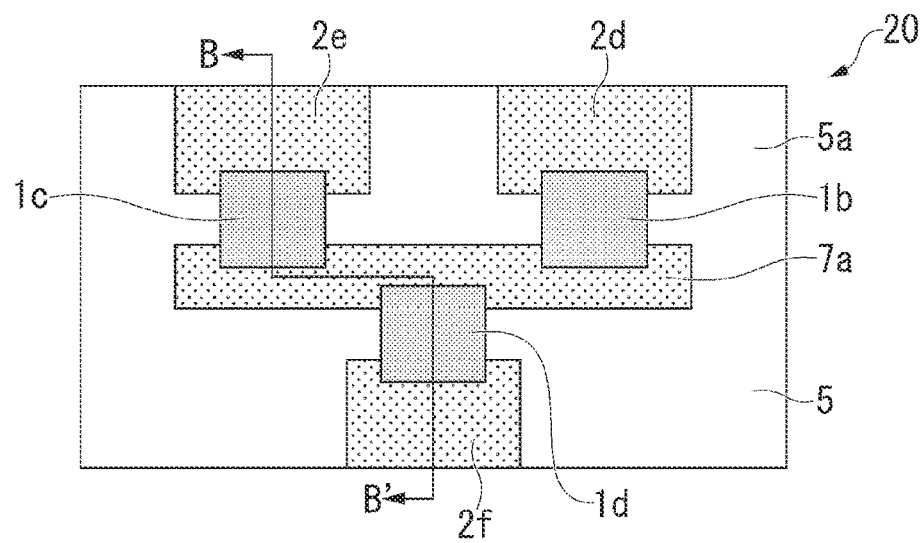
FIG. 5 is a plan view showing a protective element according to a second embodiment.
Figure 6:
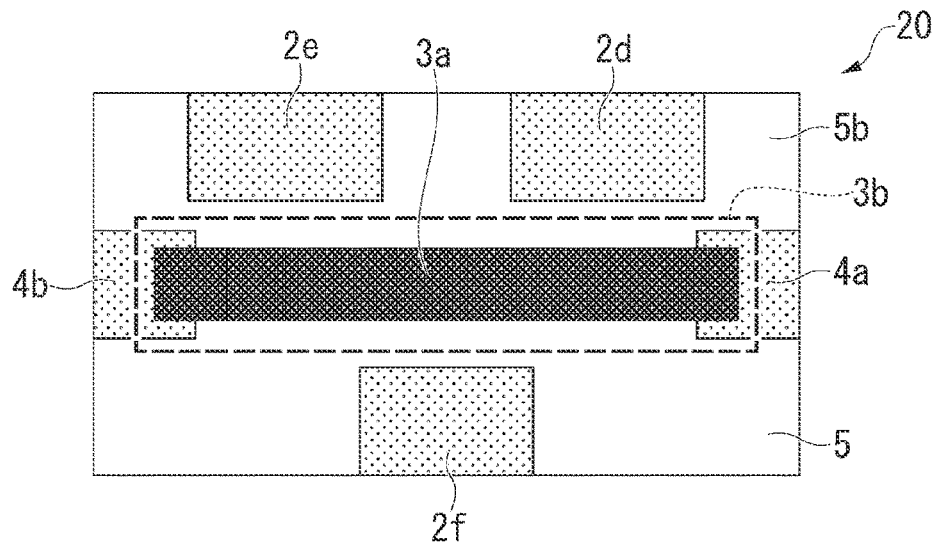
FIG. 6 is a plan view in which the protective element shown in FIG. 5 is viewed from the opposite side to that in FIG. 5.
Figure 7:
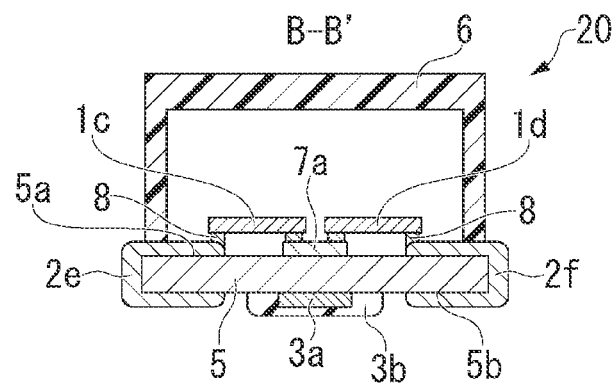
FIG. 7 is a sectional view in which the protective element shown in FIG. 5 is taken along the B-B' line.
Figure 8:
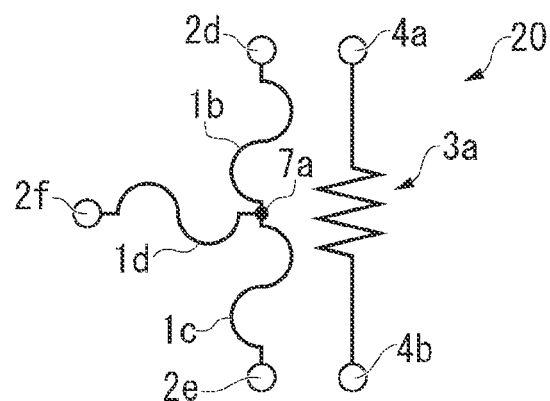
FIG. 8 is a schematic diagram showing a protective circuit of the second embodiment having a circuit configuration of the protective element shown in FIG. 5.

FIG. 5 is a plan view showing a protective element of a second embodiment. FIG. 6 is a plan view in which the protective element shown in FIG. 5 is viewed from the opposite side to that in FIG. 5. FIG. 7 is a sectional view in which the protective element shown in FIG. 5 is taken along the B-B' line. FIG. 8 is a schematic diagram showing a protective circuit of the second embodiment having a circuit configuration of the protective element shown in FIG. 5. FIG. 5 shows a state in which a cover member 6 of a protective element 20 shown in FIG. 7 is removed.

As shown in FIGS. 5 to 7, the protective element 20 of the present embodiment includes an insulating substrate 5, three fusible conductors 1b, 1c, 1d, three electrodes 2d, 2e, 2f, a heating element 3a, an insulating member 3b, a first heating element electrode 4a, a second heating element electrode 4b, a cover member 6, and a connection wiring 7a.

In the protective element 20 of the present embodiment, the same members as those of the protective element 10 of the first embodiment are given the same reference signs, and the description thereof will be omitted.

As shown in FIG. 5, in the protective element 20 of the present embodiment, unlike the protective element 10 of the first embodiment, three fusible conductors 1b, 1c, and 1d having substantially the same shape are provided on the front surface 5a of the insulating substrate 5. The three fusible conductors 1b, 1c, and 1d all have a substantially rectangular shape in a plan view.

The three fusible conductors 1b, 1c, and 1d may be made of different materials, or two or all of the three may be made of the same material. In the present embodiment, the three fusible conductors 1b, 1c, and 1d have substantially the same shape.

Therefore, in a case where the fusible conductors are all made of the same material, the three fusible conductors 1b, 1c, and 1d are easily fused and become substantially uniform, which is preferable. In a case where the three fusible conductors 1b, 1c, and 1d are all made of the same material, the fusible conductors 1b, 1c, and 1d can be formed with a smaller number of manufacturing steps than in a case where some or all of the three are made of different materials, and thus the productivity is excellent.

In the protective element 20 of the present embodiment, electrodes 2d and 2e are provided in the same manner as in the electrodes 2a and 2b of the protective element 10 of the first embodiment. However, as shown in FIG. 5, an electrode 2f in the protective element 20 of the present embodiment has substantially the same shape as that of the electrodes 2d and 2e, unlike the electrode 2c in the protective element 10 of the first embodiment.

As shown in FIG. 5, in the protective element 20 of the present embodiment, unlike the protective element 10 of the first embodiment, a connection wiring 7a is provided on the front surface 5a of the insulating substrate 5. As shown in FIGS. 5 and 7, the connection wiring 7a is provided in a strip shape along the long side direction at the substantially central portion in the short side direction of the insulating substrate 5 having a substantially rectangular shape in a plan view. As shown in FIG. 7, the connection wiring 7a overlaps at least part of the heating element 3a in a plan view. Thus, in a case where the heating element 3a generates heat, the heat is efficiently transferred to the region where the heating element 3a and the connection wiring 7a overlap each other in a plan view via the insulating substrate 5. Then, the fusible conductors 1b, 1c, and 1d are efficiently heated via the connection wiring 7a, and the fusible conductors 1b, 1c, and 1d are quickly fused.

As a material of the connection wiring 7a, the same material as the material that may be used for the electrodes 2a, 2b, and 2c in the protective element 10 of the first embodiment may be used.

In the protective element 20 of the present embodiment, as shown in FIG. 5, the fusible conductor 1b is disposed to straddle the connection wiring 7a and the electrode 2d. The fusible conductor 1c is disposed to straddle the connection wiring 7a and the electrode 2e. The fusible conductor 1d is disposed to straddle the connection wiring 7a and the electrode 2f. That is, the fusible conductor 1b spans the connection wiring 7a to the electrode 2d, the fusible conductor 1c spans the connection wiring 7a to the electrode 2e, and the fusible conductor 1d spans the connection wiring 7a to the electrode 2f. Consequently, the three electrodes 2d, 2e, and 2f are electrically connected to each other via the three fusible conductors 1b, 1c, and 1d electrically connected via the connection wiring 7a.

In the protective element 20 of the present embodiment, as shown in FIG. 7, the cover member 6 is attached to the front surface 5a of the insulating substrate 5 via an adhesive (not shown). The cover member 6 is attached, and thus the fusible conductors 1b, 1c, and 1d and the electrodes 2d, 2e, and 2f formed on the front surface 5a of the insulating substrate 5 are protected. The cover member 6 is attached, and thus scattering of a fused substance generated due to fusing of the fusible conductors 1b, 1c and 1d is prevented.

As a material of the cover member 6, for example, various engineering plastics and/or ceramics may be used.

As shown in FIGS. 6 and 7, the protective element 20 of the present embodiment is provided with an insulating member 3b that covers the heating element 3a provided on the rear surface 5b of the insulating substrate 5. The insulating member 3b is made of an insulating material such as glass.

(Production Method)

The protective element 20 of the present embodiment may be manufactured, for example, according to a method described below.

First, the three electrodes 2d, 2e, and 2f, the first heating element electrode 4a, and the second heating element electrode 4b are formed at predetermined positions on the front surface 5a and/or the rear surface 5b of the insulating substrate 5 in the same manner as in the protective element 10 of the first embodiment.

The connection wiring 7a is formed on the front surface 5a of the insulating substrate 5 in the same manner as the electrodes 2d, 2e, and 2f. In a case where the connection wiring 7a is formed by using the same material as that of the electrodes 2d, 2e, and 2f, the connection wiring 7a and the electrodes 2d, 2e, and 2f may be simultaneously formed.

Thereafter, in the same manner as in the protective element 10 of the first embodiment, the electrodes 2d, 2e, and 2f formed on the front surface 5a of the insulating substrate 5 are electrically connected to the electrodes 2d, 2e, and 2f formed on the rear surface 5b of the insulating substrate 5.

Next, in the same manner as in the protective element 10 of the first embodiment, the heating element 3a is formed at a predetermined position on the rear surface 5b of the insulating substrate 5. Subsequently, the insulating member 3b covering the heating element 3a is formed on the heating element 3a according to a known method of the related art.

Next, the fusible conductors 1b, 1c, and 1d are joined to the electrodes 2d, 2e, and 2f and the connection wiring 7a formed on the front surface 5a of the insulating substrate 5 by using a conductive connection member 8 such as a solder.

Next, as shown in FIG. 7, the cover member 6 is attached to the front surface 5a of the insulating substrate 5 by using an adhesive (not shown).

Through the above steps, the protective element 20 of the present embodiment is obtained.

In the present embodiment, a case where the protective element 20 is used for the same purpose of stopping the motor as in the first embodiment will be described as an exemplary example.

In the protective element 20 of the present embodiment, the fusible conductors 1b, 1c, and 1d each form parts of current paths for supplying power to the three coils. In the present embodiment, at least two of the fusible conductors 1b, 1c, and 1d are fused to cut off current paths for supplying power to at least two of the three coils.

The protective element 20 of the present embodiment forms a joint portion in a Y connection (star connection) in the same manner as in the protective element 10 of the first embodiment. However, unlike the protective element 10 of the first embodiment, in the protective element 20 of the present embodiment, a neutral point of the Y connection is formed in the connection wiring 7a electrically connected to the fusible conductors 1b, 1c, and 1d of the protective element 20.

FIG. 8 is a schematic diagram showing a protective circuit of a second embodiment having a circuit configuration of the protective element 20 shown in FIG. 5. In FIG. 8, the same members as those of the protective element 20 shown in FIGS. 5 to 7 are given the same reference signs.

As shown in FIGS. 5 and 8, the electrode 2*d* is electrically connected to the fusible conductor 1*b*. The electrode 2*e* is electrically connected to the fusible conductor 1*c*. The electrode 2*f* is electrically connected to the fusible conductor 1*d*. In the protective circuit shown in FIG. 8, a Y connection (star connection) is used in which a side of the fusible conductor 1*b* opposite to the electrode 2*d*, a side of the fusible conductor 1*c* opposite to the electrode 2*e*, and a side of the fusible conductor 1*d* opposite side to the electrode 2*f* are collectively connected to each other via the connection wiring 7*a*.

As shown in FIG. 8, the heating element 3*a* is electrically connected to two heating element electrodes such as the first heating element electrode 4*a* and the second heating element electrode 4*b*. As shown in FIG. 8, the heating element 3*a* is electrically insulated from the fusible conductors 1*b*, 1*c*, and 1*d*.

The protective circuit of the present embodiment detects an abnormality in the power supplied to some or all of the three electrodes 2*d*, 2*e*, and 2*f*, and thus cuts off at least two current paths among the three power supply wirings for respectively supplying power to the three electrodes 2*d*, 2*e*, and 2*f*.

In the present embodiment, a detection circuit detects an abnormality in the power supplied to the three electrodes 2*d*, 2*e*, and 2*f* in the same manner as in the first embodiment.

The control circuit grounds the second heating element electrode 4*b* and supplies power to the heating element 3*a* via the first heating element electrode 4*a* in the same manner as in the first embodiment according to the detection result from the detection circuit. Consequently, the heating element 3*a* of the protective element 20 generates heat and heats the connection wiring 7*a* via the insulating substrate 5. The fusible conductors 1*b*, 1*c*, and 1*d* are heated and fused via the insulating substrate 5 and/or the connection wiring 7*a*.

In the present embodiment, in a case where an overcurrent exceeding the rating is applied to some or all of the three electrodes 2*d*, 2*e*, and 2*f*, the fusible conductors 1*b*, 1*c*, and 1*d* of the protective element 20 are melted and fused due to self-heating even if the heating element 3*a* is not supplied with power.

In a case where at least two of the fusible conductors 1*b*, 1*c*, and 1*d* shown in FIG. 8 are fused to cut off at least two connections among the electrodes 2*d* and the connection wiring 7*a*, the electrode 2*e* and the connection wiring 7*a*, and the electrode 2*d* and the connection wiring 7*a*, at least two current paths among the three power supply wirings for respectively supplying power to the three electrodes 2*d*, 2*e*, and 2*f* are cut off.

As a result, in the present embodiment, a rotating magnetic field that rotates the motor is not generated, and rotation of the motor is stopped. After the rotation of the motor is stopped, the control circuit stops grounding of the second heating element electrode 4*b*, and the supply of power to the heating element 3*a* is stopped.

The protective element 20 and the protective circuit of the present embodiment include the fusible conductors 1*b*, 1*c* and 1*d*, the three electrodes 2*d*, 2*e*, and 2*f* that are electrically connected to each other via the fusible conductors 1*b*, 1*c* and 1*d*, and the heating element 3*a* that heats and fuses the fusible conductor. Thus, according to the protective element 20 and the protective circuit of the present embodiment, the three current paths electrically connected to the three electrodes 2*d*, 2*e*, and 2*f* can be cut off by a single element due to heat generated by the heating element 3*a*.

The protective element 20 and the protective circuit of the present embodiment can be suitably used for the purpose of stopping the motor in a case where an abnormality has occurred in the power supplied to some or all of the coils in the motor that performs rotation by using the three coils and power having different phases supplied to each of the coils.

The protective element 20 and the protective circuit of the present embodiment are smaller than a three-terminal contact relay, and can cause a large current to flow, and a conduction failure due to the dirt on contacts does not occur unlike the three-terminal contact relay.

Third Embodiment

Figure 9:
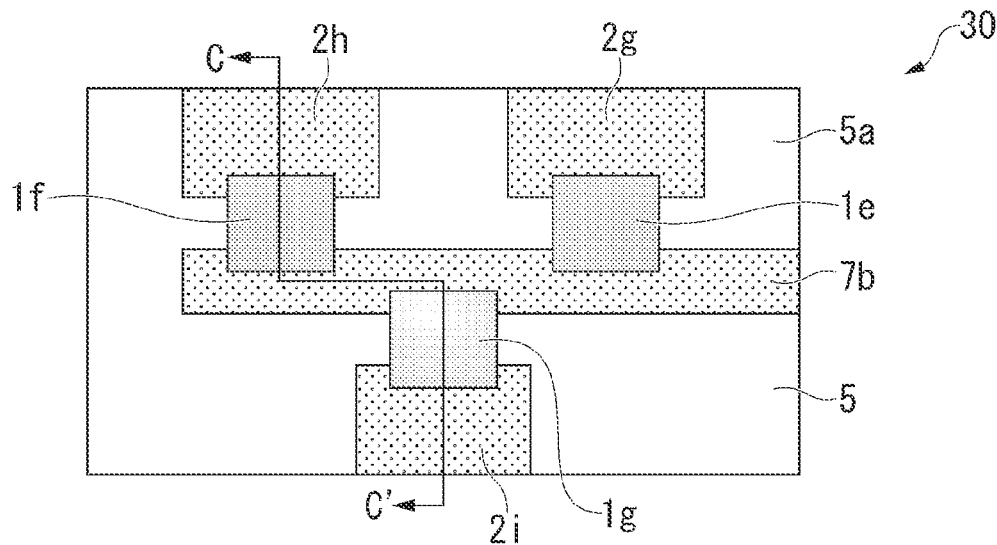
FIG. 9 is a plan view showing a protective element according to a third embodiment.
Figure 11:
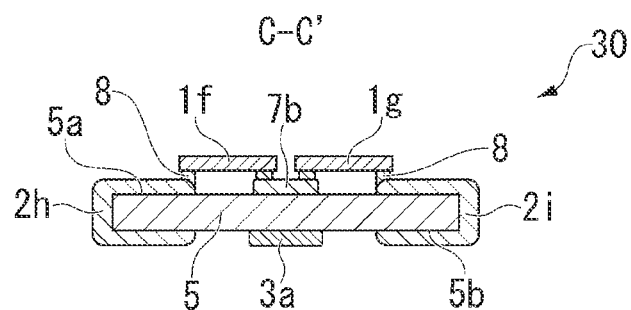
FIG. 11 is a sectional view in which the protective element shown in FIG. 9 is taken along the C-C' line.
Figure 12:
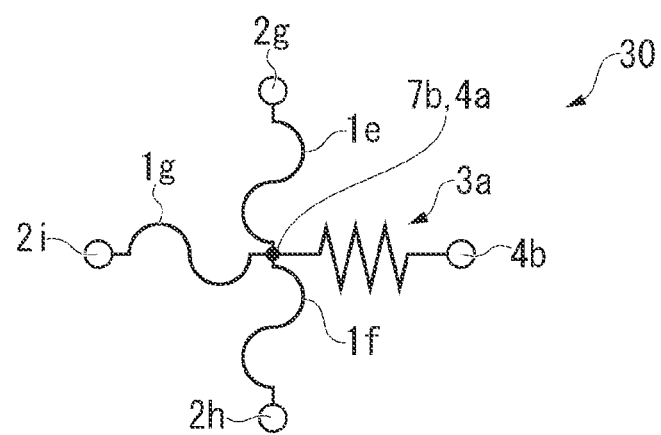
FIG. 12 is a schematic diagram showing a protective circuit of the third embodiment having a circuit configuration of the protective element shown in FIG. 9.

FIG. 9 is a plan view showing a protective element of a third embodiment. FIG. is a plan view in which the protective element shown in FIG. 9 is viewed from the opposite side to that in FIG. 9. FIG. 11 is a sectional view in which the protective element shown in FIG. 9 is taken along the C-C' line. FIG. 12 is a schematic diagram showing a protective circuit of the third embodiment having a circuit configuration of the protective element shown in FIG. 9.

Figure 10:
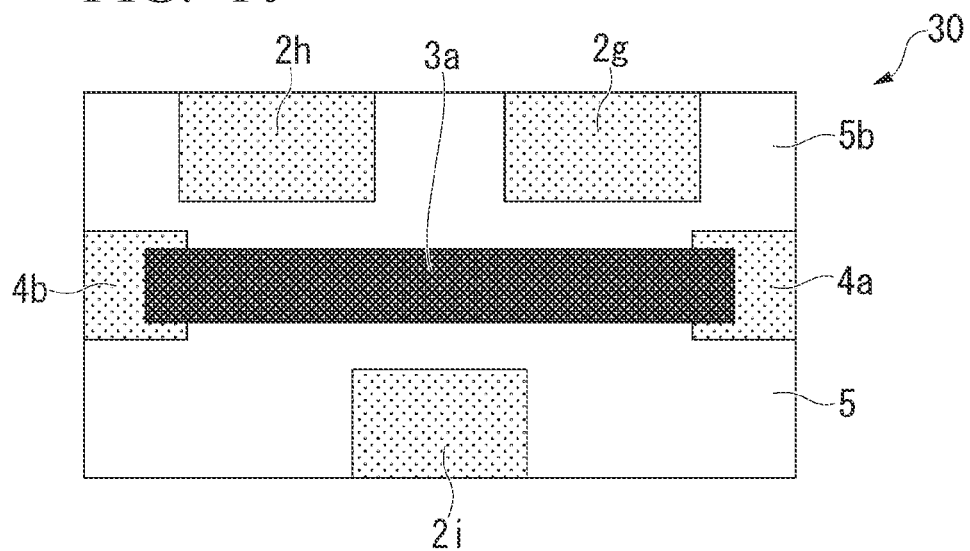
FIG. 10 is a plan view in which the protective element shown in FIG. 9 is viewed from the opposite side to that in FIG. 9.

As shown in FIGS. 9 to 11, a protective element 30 of the present embodiment includes an insulating substrate 5, three fusible conductors 1*e*, 1*f*, and 1*g*, three electrodes 2*g*, 2*h*, and 2*i*, a heating element 3*a*, a first heating element electrode 4*a*, a second heating element electrode 4*b*, and a connection wiring 7*b*.

In the protective element 30 of the present embodiment, the same members as those of the protective element 10 of the first embodiment are given the same reference signs, and the description thereof will be omitted.

The protective element 30 of the present embodiment and the protective element of the second embodiment are different from each other in that the protective element is not provided with the insulating member 3*b* and the cover member 6 of the protective element 20 of the second embodiment, and a shape of a connection wiring differs. Therefore, the protective element 30 of the present embodiment will be described for portions different from the protective element 20 of the second embodiment.

The connection wiring 7*b* in the protective element 30 of the present embodiment is provided in a strip shape along the long side direction at the substantially central portion in the short side direction of the insulating substrate 5 having a substantially rectangular shape in a plan view. One end of the connection wiring 7*b* in the protective element 30 is separated from one side surface of the insulating substrate 5 in the short side direction, and unlike the connection wiring 7*a* in the protective element of the second embodiment, the other end thereof extends to the other side surface of the insulating substrate 5 in the short side direction. The connection wiring 7*b* in the protective element 30 is electrically connected to the heating element electrode 4*a* provided on the rear surface 5*b* of the insulating substrate 5 via a casting that is formed by covering the inside of a substantially semicircular through-hole formed on the side surface of the insulating substrate 5 with a conductive material. Consequently, in the protective element 30 of the present embodiment, the heating element 3*a* electrically connected to the first heating element electrode 4*a* is electrically connected to the three fusible conductors 1*e*, 1*f*, and 1*g* electrically connected to the connection wiring 7*b*.

The protective element 30 of the present embodiment include the control circuit that supplies power to the heating element 3a when detecting an abnormality in the power supplied to some or all of the three electrodes 2g, 2h, and 2i, in the same manner as the protective element 10 of the first embodiment and the protective element 20 of the second embodiment. However, the control circuit of the protective element 30 of the present embodiment is different from the protective element 10 of the first embodiment and the protective element 20 of the second embodiment in a case where the above abnormality is detected in that the second heating element electrode 4b is grounded, and power is supplied to the heating element 3a via the three fusible conductors 1e, 1f, and 1g and the first heating element electrode 4a.

(Production Method)

The protective element 30 of the present embodiment may be manufactured, for example, according to a method described below.

First, the three electrodes 2g, 2h, and 2i, the first heating element electrode 4a, the second heating element electrode 4b, and the connection wiring 7b are formed at predetermined positions on the front surface 5a and/or the rear surface 5b of the insulating substrate 5 in the same manner as in the protective element 20 of the second embodiment.

Thereafter, in the same manner as in the protective element 10 of the first embodiment, the electrodes 2g, 2h, and 2i formed on the front surface 5a of the insulating substrate 5 are electrically connected to the electrodes 2g, 2h, and 2i formed on the rear surface 5b of the insulating substrate 5. In the same manner as in the electrodes 2g, 2h and 2i, the connection wiring 7b formed on the front surface 5a of the insulating substrate is electrically connected to the first heating element electrode 4a formed on the rear surface 5b of the insulating substrate 5.

Next, in the same manner as in the protective element 10 of the first embodiment, the heating element 3a is formed at a predetermined position on the rear surface 5b of the insulating substrate 5.

Next, the fusible conductors 1e, 1f, and 1g are joined to the electrodes 2g, 2h, and 2i, and the connection wiring 7b formed on the front surface 5a of the insulating substrate 5 by using a conductive connection member 8 such as a solder.

Through the above steps, the protective element 30 of the present embodiment is obtained.

In the present embodiment, a case where the protective element 30 is used for the same purpose of stopping the motor as in the first embodiment and the second embodiment will be described as an exemplary example.

In the same manner as the protective element 20 of the second embodiment, in the protective element 30 of the present embodiment, the fusible conductors 1e, 1f, and 1g each form parts of current paths for supplying power to the three coils. In the present embodiment, at least two of the fusible conductors 1e, 1f, and 1g are fused to cut off current paths for supplying power to at least two of the three coils.

In the same manner as the protective element 20 of the second embodiment, the protective element 30 of the present embodiment forms a joint portion in a Y connection (star connection). In the same manner as in the protective element 20 of the second embodiment, in the protective element 30 of the present embodiment, a neutral point of the Y connection is formed in the connection wiring 7b electrically connected to the fusible conductors 1e, 1f, and 1g of the protective element 30.

FIG. 12 is a schematic diagram showing a protective circuit of the third embodiment having a circuit configuration of the protective element 30 shown in FIG. 9. In FIG. 12, the same members as those of the protective element 30 shown in FIGS. 9 to 11 are given the same reference signs.

As shown in FIGS. 9 and 12, the electrode 2g is electrically connected to the fusible conductor 1e. The electrode 2h is electrically connected to the fusible conductor 1f. The electrode 2i is electrically connected to the fusible conductor 1g. In the protective circuit shown in FIG. 12, a Y connection (star connection) is used in which a side of the fusible conductor 1e opposite to the electrode 2g, a side of the fusible conductor 1f opposite to the electrode 2h, and a side of the fusible conductor 1g opposite side to the electrode 2i are collectively connected to each other via the connection wiring 7b.

As shown in FIG. 12, the heating element 3a is electrically connected to two heating element electrodes such as the first heating element electrode 4a and the second heating element electrode 4b. The heating element electrode 4a is electrically connected to the connection wiring 7b, and thus the heating element 3a is electrically connected to the fusible conductors 1e, 1f, and 1g.

The protective circuit of the present embodiment detects an abnormality in the power supplied to some or all of the three electrodes 2g, 2h, and 2i, and thus cuts off at least current paths among the three power supply wirings for respectively supplying power to the three electrodes 2g, 2h, and 2i.

In the present embodiment, the detection circuit detects an abnormality in the power supplied to the three electrodes 2g, 2h, and 2i in the same manner as in the first embodiment.

The control circuit grounds the second heating element electrode 4b and supplies power to the heating element 3a via the three fusible conductors 1e, 1f, and 1g, and the first heating element electrode 4a according to the detection result from the detection circuit. Consequently, the heating element 3a of the protective element 30 generates heat and heats the connection wiring 7b via the insulating substrate 5. Then, the fusible conductors 1e, 1f, and 1g are heated and fused via the insulating substrate 5 and/or the connection wiring 7b.

In the present embodiment, in a case where an overcurrent exceeding the rating is applied to some or all of the three electrodes 2g, 2h, and 2i, the fusible conductors 1e, 1f, and 1g of the protective element 30 are melted and fused due to self-heating even if the heating element 3a is not supplied with power.

In a case where at least two of the fusible conductors 1e, 1f, and 1g shown in FIG. 12 are fused to cut off at least two connections among the electrodes 2d and the connection wiring 7b, the electrode 2e and the connection wiring 7b, and the electrode 2d and the connection wiring 7b, at least two current paths among the three power supply wirings for respectively supplying power to the three electrodes 2g, 2h, and 2i are cut off.

As a result, in the present embodiment, a rotating magnetic field that rotates the motor is not generated, and rotation of the motor is stopped. After the rotation of the motor is stopped, the control circuit stops grounding of the second heating element electrode 4b, and the supply of power to the heating element 3a is stopped.

The protective element 30 and the protective circuit of the present embodiment include the fusible conductors 1e, 1f and 1g, the three electrodes 2g, 2h, and 2i that are electrically connected to each other via the fusible conductors 1e, 1f, and 1g, and the heating element 3a that heats and fuses the fusible conductor. Therefore, according to the protective element 30 and the protective circuit of the present embodiment, the three current paths electrically connected to the three electrodes 2g, 2h, and 2i can be cut off by a single element due to heat generated by the heating element 3a.

The protective element 30 and the protective circuit of the present embodiment can be suitably used for the purpose of stopping the motor in a case where an abnormality has occurred in the power supplied to some or all of the coils in the motor that performs rotation by using the three coils and power having different phases supplied to each of the coils.

The protective element 30 and the protective circuit of the present embodiment are smaller than a three-terminal contact relay, and can cause a large current to flow, and a conduction failure due to the dirt on contacts does not occur unlike the three-terminal contact relay.

Fourth Embodiment

Figure 13:
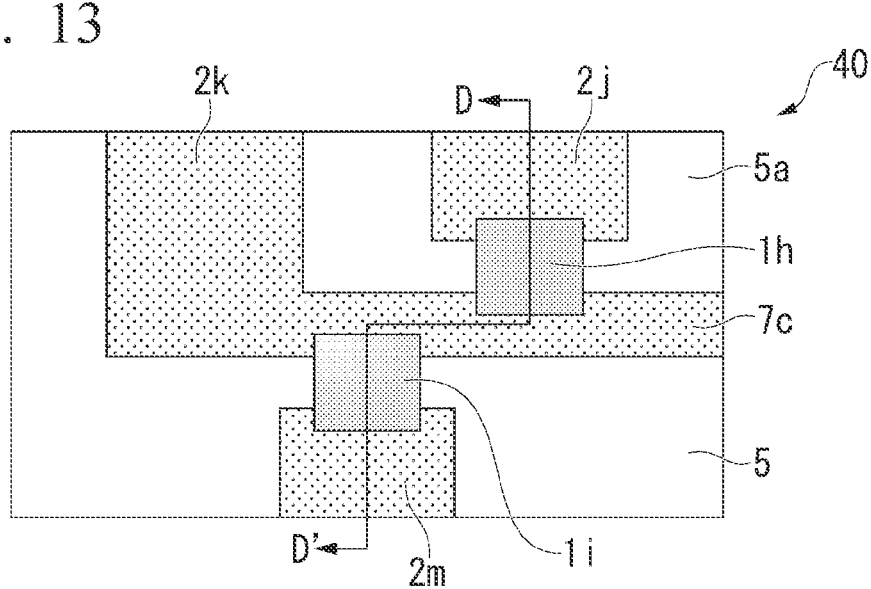
FIG. 13 is a plan view showing a protective element according to a fourth embodiment.
Figure 14:
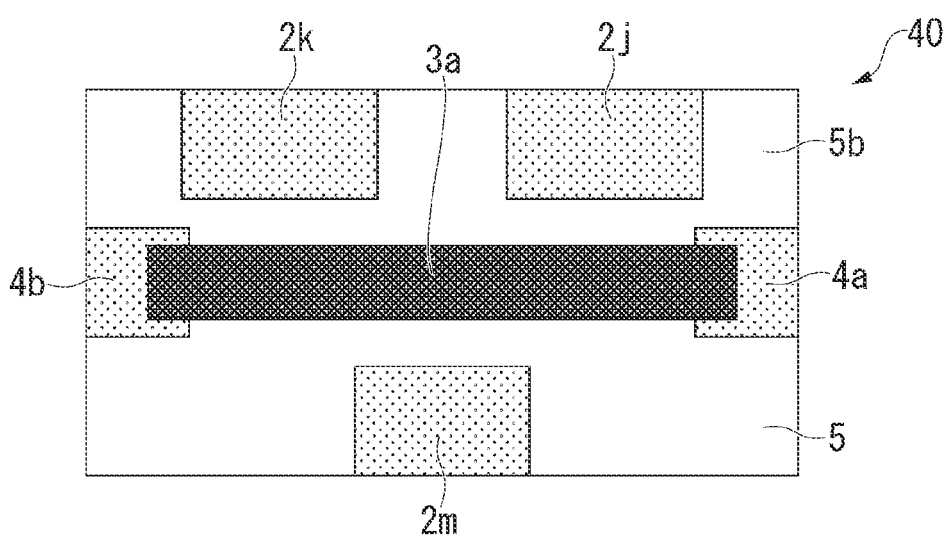
FIG. 14 is a plan view in which the protective element shown in FIG. 13 is viewed from the opposite side to that in FIG. 13.
Figure 15:
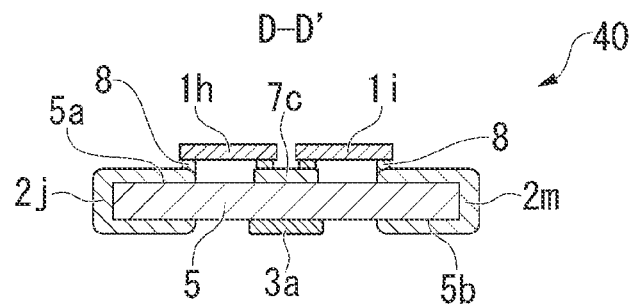
FIG. 15 is a sectional view in which the protective element shown in FIG. 13 is taken along the D-D' line.
Figure 16:
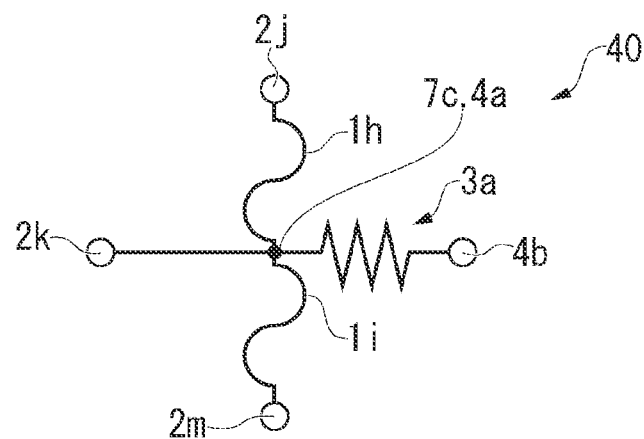
FIG. 16 is a schematic diagram showing a protective circuit of a fourth embodiment having a circuit configuration of the protective element shown in FIG. 13.

FIG. 13 is a plan view showing a protective element of a fourth embodiment. FIG. 14 is a plan view in which the protective element shown in FIG. 13 is viewed from the opposite side to that in FIG. 13. FIG. 15 is a sectional view in which the protective element shown in FIG. 13 is taken along the D-D' line. FIG. 16 is a schematic diagram showing a protective circuit of the fourth embodiment having a circuit configuration of the protective element shown in FIG. 13.

As shown in FIGS. 13 to 15, a protective element 40 of the present embodiment includes an insulating substrate 5, two fusible conductors 1h and 1i, three electrodes 2j, 2k, and 2m, a heating element 3a, a first heating element electrode 4a, a second heating element electrode 4b, and a connection wiring 7c.

In the protective element 30 of the present embodiment, the same members as those of the protective element 10 of the first embodiment are given the same reference signs, and the description thereof will be omitted.

The protective element 40 of the present embodiment is different from the protective element 30 of the third embodiment in that the protective element 40 of the present embodiment is not provided with the fusible conductor 1f in the protective element 30 of the third embodiment and the connection wiring 7c is connected to and integrated with an electrode 2k. Therefore, the protective element 40 of the present embodiment will be described for portions different from the protective element 30 of the third embodiment.

The connection wiring 7c in the protective element 40 of the present embodiment has a substantially L shape in a plan view, unlike the connection wiring 7b in the protective element 30 of the third embodiment. More specifically, the connection wiring 7c in the protective element 40 is provided in a strip shape along the long side direction at the substantially central portion in the short side direction of the insulating substrate 5 having a substantially rectangular plan view, and has a shape in which a linear portion of which one end extends to one side surface in the short side direction of the insulating substrate 5 is integrated with the electrode 2k that extends from the other end of the linear portion to one side surface in the long side direction of the insulating substrate 5.

The connection wiring 7c in the protective element 40 of the present embodiment is electrically connected to the heating element electrode 4a provided on the rear surface 5b of the insulating substrate 5 in the same manner as the connection wiring 7b in the protective element 30 of the third embodiment. Consequently, in the protective element 40 of the present embodiment, the heating element 3a electrically connected to the heating element electrode 4a is electrically connected to the two fusible conductors 1h and 1i electrically connected to the connection wiring 7c.

(Production Method)

The protective element 40 of the present embodiment may be manufactured, for example, according to a method described below.

First, the three electrodes 2j, 2k, and 2m, the first heating element electrode 4a, and the second heating element electrode 4b are formed at predetermined positions on the front surface 5a and/or the rear surface 5b of the insulating substrate 5 in the same manner as in the protective element 10 of the first embodiment. In the present embodiment, the connection wiring 7c integrated with the electrode 2k is formed together with the electrode 2k on the front surface 5a of the insulating substrate 5.

Thereafter, the electrodes 2j, 2k, and 2m formed on the front surface 5a of the insulating substrate 5 are electrically connected to the electrodes 2j, 2k, and 2m formed on the rear surface 5b of the insulating substrate 5 in the same manner as in the protective element 10 of the first embodiment. In the same manner as in the electrodes 2j, 2k, and 2m, the connection wiring 7c formed on the front surface 5a of the insulating substrate 5 is electrically connected to the first heating element electrode 4a formed on the rear surface 5b of the insulating substrate 5.

Next, in the same manner as in the protective element 10 of the first embodiment, the heating element 3a is formed at a predetermined position on the rear surface 5b of the insulating substrate 5.

Next, the fusible conductors 1h and 1i are joined to the electrodes 2j and 2m and the connection wiring 7c formed on the front surface 5a of the insulating substrate 5 by using a conductive connection member 8 such as a solder.

Through the above steps, the protective element 40 of the present embodiment is obtained.

In the present embodiment, a case where the protective element 40 is used for the same purpose of stopping the motor as in the first to third embodiments will be described as an exemplary example.

In the protective element 40 of the present embodiment, the fusible conductors 1h and 1i each form parts of current paths for supplying power to two of the three coils.

In the present embodiment, both the fusible conductor 1h and the fusible conductor 1i are fused to cut off current paths for supplying power to at least two of the three coils.

The protective element 40 of the present embodiment forms a joint portion in a Y connection (star connection) in the same manner as the protective element 30 of the third embodiment. In the protective element 40 of the present embodiment, a neutral point of the Y connection is formed in the connection wiring 7c electrically connected to the fusible conductors 1h and 1i.

FIG. 16 is a schematic diagram showing a protective circuit of the fourth embodiment having a circuit configuration of the protective element 40 shown in FIG. 13. In FIG. 16, the same members as those of the protective element 40 shown in FIGS. 13 to 15 are given the same reference signs.

As shown in FIGS. 13 and 16, the electrode 2j is electrically connected to the fusible conductor 1h. The electrode 2m is electrically connected to the fusible conductor 1i. In the protective circuit shown in FIG. 16, a Y connection (star connection) is used in which a side of the fusible conductor 1h opposite to the electrode 2j, a side of the fusible conductor 1i opposite to the electrode 2m, and the electrode 2k are collectively connected to each other via the connection wiring 7c.

As shown in FIG. 16, the heating element 3a is electrically connected to two heating element electrodes such as the first heating element electrode 4a and the second heating element electrode 4b. The heating element electrode 4a is electrically connected to the connection wiring 7c, and thus the heating element 3a is electrically connected to the fusible conductors 1h and 1i.

The protective circuit of the present embodiment detects an abnormality in the power supplied to some or all of the three electrodes 2j, 2k, and 2m, and thus cuts off current paths for supplying power to the electrodes 2j and 2m among the three power supply wirings for respectively supplying power to three electrodes 2j, 2k, and 2m.

In the present embodiment, the detection circuit detects an abnormality in the power supplied to the three electrodes 2j, 2k, and 2m in the same manner as in the first embodiment.

The control circuit grounds the second heating element electrode 4b and supplies power to the heating element 3a via the connection wiring 7c, the fusible conductors 1h and 1i, and the first heating element electrode 4a according to the detection result from the detection circuit. Consequently, the heating element 3a of the protective element 30 generates heat and heats the connection wiring 7c via the insulating substrate 5. The fusible conductors 1h and 1i are heated and fused via the insulating substrate 5 and/or the connection wiring 7c.

In the present embodiment, in a case where an overcurrent exceeding the rating is applied to some or all of the three electrodes 2j, 2k, and 2m, the fusible conductors 1h and 1i of the protective element 40 are melted and fused due to self-heating even if the heating element 3a is not supplied with power.

In a case where the two fusible conductors 1h and 1i shown in FIG. 16 are fused to cut off the connection between the electrode 2j and the connection wiring 7c and the connection between the electrode 2m and the connection wiring 7c, at least two current paths among the three power supply wirings for respectively supplying power to the three electrodes 2j, 2k, and 2m are cut off.

As a result, in the present embodiment, a rotating magnetic field that rotates the motor is not generated, and rotation of the motor is stopped. After the rotation of the motor is stopped, the control circuit stops grounding of the second heating element electrode 4b, and the supply of power to the heating element 3a is stopped.

The protective element 40 and the protective circuit of the present embodiment include the fusible conductor 1h and 1i, the three electrodes 2j, 2k, and 2m electrically connected to each other via the fusible conductor 1h and 1i, and the heating element 3a that heats and fuses the fusible conductors 1h and 1i. Therefore, according to the protective element 40 and the protective circuit of the present embodiment, the three current paths electrically connected to the three electrodes 2j, 2k, and 2m can be cut off by a single element due to heat generated by the heating element 3a.

The protective element 40 and the protective circuit of the present embodiment can be suitably used for the purpose of stopping the motor in a case where an abnormality has occurred in the power supplied to some or all of the coils in the motor that performs rotation by using the three coils and power having different phases supplied to each of the coils.

The protective element 40 and the protective circuit of the present embodiment are smaller than a three-terminal contact relay, and can cause a large current to flow, and a conduction failure due to the dirt on contacts does not occur unlike the three-terminal contact relay.

Fifth Embodiment

Figure 17:
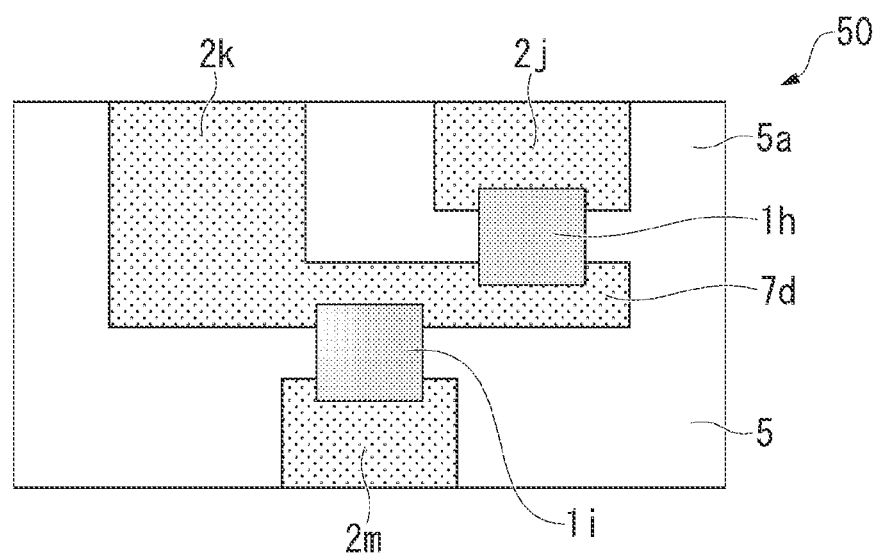
FIG. 17 is a plan view showing a protective element according to a fifth embodiment.
Figure 18:
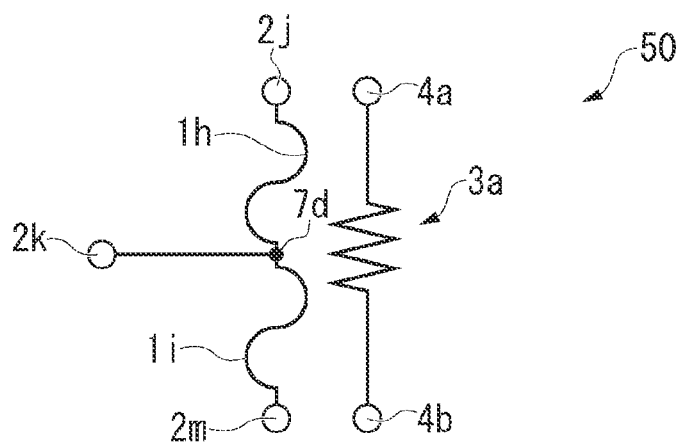
FIG. 18 is a schematic diagram showing a protective circuit of the fifth embodiment having a circuit configuration of the protective element shown in FIG. 17.

FIG. 17 is a plan view showing a protective element of a fifth embodiment. FIG. 18 is a schematic diagram showing a protective circuit of the fifth embodiment having a circuit configuration of the protective element shown in FIG. 17. A plan view in which the protective element shown in FIG. 17 is viewed from the opposite side to that in FIG. 17 is the same as that of FIG. 14. A sectional view of the protective element shown in FIG. 17 is the same as that in FIG. 15.

The protective element 50 of the present embodiment includes an insulating substrate 5, two fusible conductors 1h and 1i, three electrodes 2j, 2k, and 2m, a heating element 3a, a first heating element electrode 4a, a second heating element electrode 4b, and a connection wiring 7d.

In the protective element 50 of the present embodiment, the same members as those of the protective element 40 of the fourth embodiment are given the same reference signs, and the description thereof will be omitted.

A shape of the connection wiring is different between the protective element 50 of the present embodiment and the protective element 40 of the fourth embodiment. Therefore, the protective element 50 of the present embodiment will be described for portions different from the protective element 40 of the fourth embodiment.

As shown in FIG. 17, the connection wiring 7d in the protective element 50 of the present embodiment has a substantially L shape in a plan view. However, unlike the connection wiring 7c in the protective element 40 of the fourth embodiment, the connection wiring 7d in the protective element 50 of the present embodiment has both ends of a linear portion that is provided in a strip shape along the long side direction at the substantially central portion in the short side direction of the insulating substrate 5 having a substantially rectangular plan view are separated from the side surfaces in the short side direction of the insulating substrate 5. Therefore, the connection wiring 7d is insulated from the heating element electrode 4a by the insulating substrate 5 and is not electrically connected to the heating element electrode 4a. Consequently, in the protective element 50 of the present embodiment, the heating element 3a electrically connected to the first heating element electrode 4a is electrically insulated from the two fusible conductors 1h and 1i electrically connected to the connection wiring 7d.

(Production Method)

The protective element 50 of the present embodiment may be manufactured, for example, according to a method described below.

First, the three electrodes 2j, 2k, and 2m, the first heating element electrode 4a, and the second heating element electrode 4b are formed at predetermined positions on the front surface 5a and/or the rear surface 5b of the insulating substrate 5 in the same manner as in the protective element 40 of the fourth embodiment. In the present embodiment, the connection wiring 7d integrated with the electrode 2k is formed together with the electrode 2k on the front surface 5a of the insulating substrate 5.

Thereafter, the electrodes 2j, 2k, and 2m formed on the front surface 5a of the insulating substrate 5 are electrically connected to the electrodes 2j, 2k, and 2m formed on the rear surface 5b of the insulating substrate 5 in the same manner as in the protective element 40 of the fourth embodiment.

Next, in the same manner as in the protective element 40 of the fourth embodiment, the heating element 3a is formed at a predetermined position on the rear surface 5b of the insulating substrate 5.

Next, the fusible conductors 1h and 1i are joined to the electrodes 2j and 2m and the connection wiring 7d formed on the front surface 5a of the insulating substrate 5 by using a conductive connection member 8 such as a solder.

Through the above steps, the protective element 50 of the present embodiment is obtained.

In the present embodiment, a case where the protective element 50 is used for the same purpose of stopping the motor as in the first to fourth embodiments will be described as an exemplary example.

In the same manner as the protective element 40 of the fourth embodiment, in the protective element 50 of the present embodiment, the fusible conductors 1h and 1i each form parts of current paths for supplying power to two of the three coils. In the present embodiment, in the same manner as the protective element 40 of the fourth embodiment, both the fusible conductor 1h and the fusible conductor 1i are fused to cut off current paths for supplying power to at least two of the three coils.

The protective element 50 of the present embodiment forms a joint portion in a Y connection (star connection) in the same manner as the protective element 40 of the fourth embodiment. In the protective element 50 of the present embodiment, a neutral point of the Y connection is formed in the connection wiring 7d electrically connected to the fusible conductors 1h and 1i.

FIG. 18 is a schematic diagram showing a protective circuit of the fifth embodiment having a circuit configuration of the protective element 50 shown in FIG. 17. In FIG. 18, the same members as those of the protective element 50 shown in FIG. 17 are given the same reference signs.

As shown in FIGS. 17 and 18, the electrode 2j is electrically connected to the fusible conductor 1h, and the electrode 2m is electrically connected to the fusible conductor 1i. In the protective circuit shown in FIG. 18, a Y connection (star connection) is used in which a side of the fusible conductor 1h opposite to the electrode 2j, a side of the fusible conductor 1i opposite to the electrode 2m, and the electrode 2k are collectively connected to each other via the connection wiring 7d.

As shown in FIG. 18, the heating element 3a is electrically connected to two heating element electrodes such as the first heating element electrode 4a and the second heating element electrode 4b. The heating element 3a is electrically insulated from the fusible conductors 1h and 1i by the insulating substrate 5.

Unlike the fourth embodiment, the control circuit of the present embodiment grounds the second heating element electrode 4b and supplies power to the heating element 3a via the first heating element electrode 4a according to the detection result from the detection circuit. Consequently, the heating element 3a of the protective element 30 generates heat, and thus the fusible conductors 1h and 1i are heated and fused via the insulating substrate 5 and/or the connection wiring 7c.

In the present embodiment, in a case where an overcurrent exceeding the rating is applied to some or all of the three electrodes 2j, 2k, and 2m, the fusible conductors 1h and 1i of the protective element 40 are melted and fused due to self-heating even if the heating element 3a is not supplied with power.

In a case where the two fusible conductors 1h and 1i shown in FIG. 18 are fused to cut off the connection between the electrode 2j and the connection wiring 7c and the connection between the electrode 2m and the connection wiring 7c, at least two current paths among the three power supply wirings for respectively supplying power to the three electrodes 2j, 2k, and 2m are cut off.

As a result, in the present embodiment, a rotating magnetic field that rotates the motor is not generated, and rotation of the motor is stopped. After the rotation of the motor is stopped, the control circuit stops grounding of the second heating element electrode 4b, and the supply of power to the heating element 3a is stopped.

The protective element 50 and the protective circuit of the present embodiment include the fusible conductor 1h and 1i, the three electrodes 2j, 2k, and 2m electrically connected to each other via the fusible conductor 1h and 1i, and the heating element 3a that heats and fuses the fusible conductors 1h and 1i. Therefore, according to the protective element 50 and the protective circuit of the present embodiment, the three current paths electrically connected to the three electrodes 2j, 2k, and 2m can be cut off by a single element due to heat generated by the heating element 3a.

The protective element 50 and the protective circuit of the present embodiment can be suitably used for the purpose of stopping the motor in a case where an abnormality has occurred in the power supplied to some or all of the coils in the motor that performs rotation by using the three coils and power having different phases supplied to each of the coils.

The protective element 50 and the protective circuit of the present embodiment are smaller than a three-terminal contact relay, and can cause a large current to flow, and a conduction failure due to the dirt on contacts does not occur unlike the three-terminal contact relay.

OTHER EXAMPLES

The protective element and the protective circuit of the present invention are not limited to the above embodiments. For example, in the above first embodiment, the case where the three electrodes 2a, 2b, and 2c are electrically connected to each other via a single fusible conductor 1a has been described as an exemplary example, but two electrodes among the three electrodes may be electrically connected to each other via a single fusible conductor. In this case, the electrode that is not electrically connected via the single fusible conductor may be electrically connected, via another fusible conductor and a connection wiring, to the two electrodes that are electrically connected to each other via the single fusible conductor, or may be electrically connected, via a connection wiring without using another fusible conductor, to the two electrodes that are electrically connected via the single fusible conductor.

In the above embodiments, the case where the protective element and the protective circuit have three electrodes has been described as an exemplary example, but the number of electrodes in the protective element and the protective circuit of the present invention is three or more, and is not limited to three.

In the above embodiments, as an exemplary example, a case has been described in which the protective element and the protective circuit are used for the purpose of stopping a motor in a case where an abnormality has occurred in the power supplied to some or all coils in the motor that creates a rotating magnetic field by using three coils (stator) and power having different phases in a three-phase alternating current supplied to each of the coils and rotates a magnet (rotor) in synchronization with the rotating magnetic field, but an application of the protective element and the protective circuit of the present invention is not limited to the above purpose.

Therefore, three or more electrodes in the protective element and the protective circuit of the present invention may be electrically connected to wirings other than power supply wirings for supplying power having different phases in a polyphase alternating current.

The present invention is not limited to a specific embodiment, and various modifications and changes can be made within the scope of the concept of the present invention described in the claims. For example, the characteristic configurations of the above embodiments may be combined.

REFERENCE SIGNS LIST 10, 20, 30, 40, 50: Protective element
1a, 1b, 1c, 1d, 1e, 1f, 1g, 1h, 1i, 11, 12, 13: Fusible conductor
2a, 2b, 2c, 2d, 2e, 2f, 2g, 2h, 2i, 2j, 2k, 2m: Electrode
3a: Heating element
3b: Insulating member
4a: First heating element electrode
4b: Second heating element electrode
5: Insulating substrate
5a: Front surface
5b: Rear surface
6: Cover member
7a, 7b, 7c, 7d: Connection wiring
8: Conductive connection member

What is claimed is:

1. A protective element comprising:
a fusible conductor;
three or more electrodes electrically connected to each other via the fusible conductor; and
a heating element configured to heat and fuse the fusible conductor,
wherein two or more electrodes among the three or more electrodes are electrically connected to each other via a single fusible conductor,
wherein the fusible conductor comprises the single fusible conductor,
wherein the heating element is electrically insulated from the fusible conductor,
wherein the three or more electrodes that power having different phases in polyphase alternating current are supplied, and
wherein the three or more electrodes do not overlap in plan view.

2. The protective element according to claim 1, wherein the fusible conductor and at least part of the heating element overlap each other in a plan view.

3. The protective element according to claim 1, which is configured to supply power to the heating element when an abnormality in power supplied to some or all of the three or more electrodes is detected.

4. A protective element comprising:
a fusible conductor;
three or more electrodes electrically connected to each other via the fusible conductor; and
a heating element configured to heat and fuse the fusible conductor,
wherein two or more electrodes among the three or more electrodes are electrically connected to each other via a plurality of fusible conductors that are electrically connected to each other via a connection wiring,
wherein the fusible conductor comprises the plurality of fusible conductors,
wherein the three or more electrodes that power having different phases in polyphase alternating current are supplied, and
wherein the three or more electrodes do not overlap in plan view.

5. The protective element according to claim 4, wherein the connection wiring and at least part of the heating element overlap each other in a plan view.

6. The protective element according to claim 4, wherein the heating element is electrically insulated from the fusible conductor.

7. The protective element according to claim 4, wherein the heating element is electrically connected to the fusible conductor.

8. A protective circuit comprising:
a fusible conductor;
three or more electrodes electrically connected to each other via the fusible conductor; and
a heating element configured to heat and fuse the fusible conductor,
wherein two or more electrodes among the three or more electrodes are electrically connected to each other via a single fusible conductor,
wherein the fusible conductor comprises the single fusible conductor,
wherein the heating element is electrically insulated from the fusible conductor, and
wherein the three or more electrodes that power having different phases in polyphase alternating current are supplied.

9. The protective circuit according to claim 8, wherein the fusible conductor and at least part of the heating element overlap each other in a plan view.

10. The protective circuit according to claim 8, which is configured to supply power to the heating element when an abnormality in power supplied to some or all of the three or more electrodes is detected.

11. A protective circuit comprising:
a fusible conductor;
three or more electrodes electrically connected to each other via the fusible conductor; and
a heating element configured to heat and fuse the fusible conductor,
wherein two or more electrodes among the three or more electrodes are electrically connected to each other via a plurality of fusible conductors that are electrically connected to each other via a connection wiring,
wherein each of the plurality of fusible conductors is the fusible conductor, and
wherein the three or more electrodes that power having different phases in polyphase alternating current are supplied.

12. The protective circuit according to claim 11, wherein the connection wiring and at least part of the heating element overlap each other in a plan view.

13. The protective circuit according to claim 11, wherein the heating element is electrically insulated from the fusible conductor.

14. The protective circuit according to claim 11, wherein the heating element is electrically connected to the fusible conductor.

* * * * *